United States Patent [19]
Pond et al.

[11] Patent Number: 5,382,963
[45] Date of Patent: Jan. 17, 1995

[54] INK JET PRINTER FOR MAGNETIC IMAGE CHARACTER RECOGNITION PRINTING

[75] Inventors: Stephen F. Pond; Ivan Rezanka, both of Pittsford, N.Y.

[73] Assignee: Xerox Corporation, Stamford, Conn.

[21] Appl. No.: 948,046

[22] Filed: Sep. 21, 1992

[51] Int. Cl.$^6$ .......................... B41J 2/01; G01D 15/16
[52] U.S. Cl. ......................................... 346/25; 347/102
[58] Field of Search .............. 346/140 R, 25; 347/102

[56] References Cited

U.S. PATENT DOCUMENTS

| | | | |
|---|---|---|---|
| 3,683,382 | 8/1972 | Ballinger | 346/74 M |
| 3,845,499 | 10/1974 | Ballinger | 360/56 |
| 3,972,715 | 8/1976 | Okumura | 96/1 R |
| 4,103,306 | 7/1978 | Clapp | 346/153 |
| 4,197,563 | 4/1980 | Michaud | 360/56 |
| 4,463,359 | 7/1984 | Ayata et al. | 346/1.1 |
| 4,571,599 | 2/1986 | Rezanka | 346/140 R |
| 4,638,337 | 1/1987 | Torpey et al. | 346/140 R |
| 4,829,324 | 5/1989 | Drake et al. | 346/140 R |
| 4,944,802 | 7/1990 | Chagnon et al. | 106/20 |

FOREIGN PATENT DOCUMENTS

| | | | |
|---|---|---|---|
| 58-04595 | 3/1983 | Japan | 346/140 R |
| 61-24975 | 11/1986 | Japan | 346/140 R |

Primary Examiner—Benjamin R. Fuller
Assistant Examiner—Valerie Ann Lund
Attorney, Agent, or Firm—Robert A. Chittum

[57] ABSTRACT

A thermal ink jet printer for printing MICR images by liquid ink droplets. The ink contains a magnetic pigment, magnetic particles, or a combination of both. An external magnetic field in the printing zone orients the magnetic pigment in a preferred direction while the printed ink droplet is still wet, so that the magnetic pigment is mobile in a liquid medium. The printed droplet is allowed to dry under the influence of the magnetic field, thereby permanently preserving the specific orientation. As a result, the remanence of the magnetic material in the images are increased and less magnetic pigment is needed for the necessary signal for MICR. This reduction in magnetic material enables the printing by a thermal ink jet printer, because nozzle clogging is avoidable.

7 Claims, 2 Drawing Sheets

INK JET PRINTER FOR MAGNETIC IMAGE CHARACTER RECOGNITION PRINTING

BACKGROUND OF THE INVENTION

This invention relates to thermal ink jet printing and, more particularly, to thermal ink jet printing of images which may be read by magnetic image character recognition (MICR) devices.

A thermal ink jet printer has at least one printhead in which thermal energy pulses are used to produce vapor bubbles in ink-filled channels and so cause droplets of ink to be expelled from the channel orifices towards a recording medium. The thermal energy pulses are usually produced by resistors, each located in a respective one of the channels, which are individually addressable by current pulses to heat and vaporize ink in the channels. As a vapor bubble grows in any one of the channels, ink bulges from the channel orifice until the current pulse has ceased and the bubble begins to collapse. At that stage, the ink within the channel retracts and separates from the bulging ink which forms a droplet moving in a direction away from the channel and towards the recording medium. The channel is then re-filled by capillary action, which in turn draws ink from a supply container. Some arrangement is usually provided to clean the channel orifices periodically while the printhead is in use and to close-off the orifices when the printhead is idle to prevent the ink in the printhead from drying out.

One form of thermal ink jet printer is described in U.S. Pat. Nos. 4,638,337 to Torpey et al., and 4,571,599 to Rezanka. These printers are each of the carriage type and have a plurality of printheads, each with its own ink supply cartridge, mounted on a reciprocating carriage. The channel orifices in each printhead are aligned perpendicular to the line of movement of the carriage and a swath of information is printed on the stationary recording medium as the carriage is moved in one direction. The recording medium is then stepped, perpendicular to the line of carriage movement, by a distance equal to the width of the printed swath and the carriage is then moved in the reverse direction to print another swath of information. As an alternative to providing each printhead with its own ink cartridge, the printheads can be supplied with ink from one or more supply tanks which need not be mounted on the carriage.

In another form of thermal ink jet printer, several printheads are accurately juxtapositioned to form a pagewidth array which remains stationary while the recording medium is moved at a constant speed in a direction perpendicular to the length of the array. Printers of that type are described in U.S. Pat. Nos. 4,463,359 to Ayata et al (see FIGS. 17 and 20) and 4,829,324 to Drake et al. In these particular printers, the printheads are mounted on a common metal plate which functions as a heat sink, for efficient dissipation of heat generated when the printer is in operation.

Images for MICR must contain magnetic material which by its remanence, coercive force, saturation magnetization and mass per unit area, assures reliable character recognition, preferably in existing reading equipment. When liquid ink is used for printing MICR images, this ink contains magnetic pigment and this dispersion must be stable with sufficiently long shelf life. The economy, performance and reliability of MICR printing is improved with the increased magnetic efficiency of the marking material, in terms of achieving the desired signal with less mass of the magnetic pigment per unit area.

U.S. Pat. No. 4,103,306 to Clapp discloses a nonimpact printer having a support for magnetic ink particles loosely distributed on its surface in mutually spaced aggregates of irregular height. The patent describes a process whereby an electrical field of short duration, established in a print position between the particles and a shaped print electrode, charges the particles and attracts them to an intervening recipient sheet so that a printed image is rendered which is more uniform by the magnetic re-orientation of the aggregates of greater height before printing.

U.S. Pat. No. 4,197,563 to Michaud discloses a method and device for orientating and fixing in a determined direction magnetic particles contained in a polymerizable ink. The patent states that the method of orientating and fixing comprises spreading magnetic, polymerizable ink on a support; conveying the support toward a zone subjected to a magnetic field; depositing the ink on the support and polymerizing by means of an ultraviolet lamp; and permanently fixing the image with the magnetic ink particles in proper orientation.

U.S. Pat. No. 3,972,715 to Olumura, discloses a particle orientation imaging system wherein an imaging member comprising a layer of softenable, electrically insulating material containing a dispersion of randomly orientated electrically photosensitive particles is imaged. The patent states that the imaging process comprises applying a uniform electric field across the member; imagewise exposing the member to activating electromagnetic radiation; and developing the member by decreasing the resistance of the softenable layer to re-orientation of the magnetic particles sufficiently to allow such a reorientation.

U.S. Pat. Nos. 3,845,499 and 3,683,382, both to Ballinger, disclose an apparatus and a recording medium responsive to force fields for orientating magnetic particles having fixed and varying magnetic field components and a method of reproducing signals on the medium. The patent discloses a recording medium which is responsive to a magnetic or electrostatic field for recording an input signal thereon having a continuous web of encapsulated or entrapped material of highly reflective flakes. Exposure to a magnetic or an electrostatic field reorients the pre-orientated flakes to provide a contrast between the exposed and unexposed portions.

SUMMARY OF THE INVENTION

It is an object of the present invention to print magnetic image character recognition (MICR) images by a thermal ink jet printer.

In the present invention, a thermal ink jet printer produces printed images on a recording medium capable of being read by a magnetic image character recognition device, comprising a printhead having at least one nozzle in fluid communication with an ink reservoir therein; a supply of ink having a predetermined quantity of elongated magnetic particles dispersed therein being supplied to the printhead reservoir; means for ejecting droplets of ink on demand from the printhead nozzles onto the recording medium in response to electrical signals representative of data to form printed data images of liquid ink on the recording medium one droplet at a time; and means for drying the printed data images under an external magnetic field having a predetermined magnetic direction so that the magnetic particles in the liquid ink are oriented according to the direction of the magnetic field while the magnetic particles are still mobile in the liquid ink of the printed images and permanently preserved in the printed data images after the printed data images are dried.

BRIEF DESCRIPTION OF THE DRAWINGS

By way of example, an embodiment of the invention will be described with reference to the accompanying drawings, in which like parts have the same index numerals and in which.

DESCRIPTION OF THE PREFERRED EMBODIMENT

Figure 1:
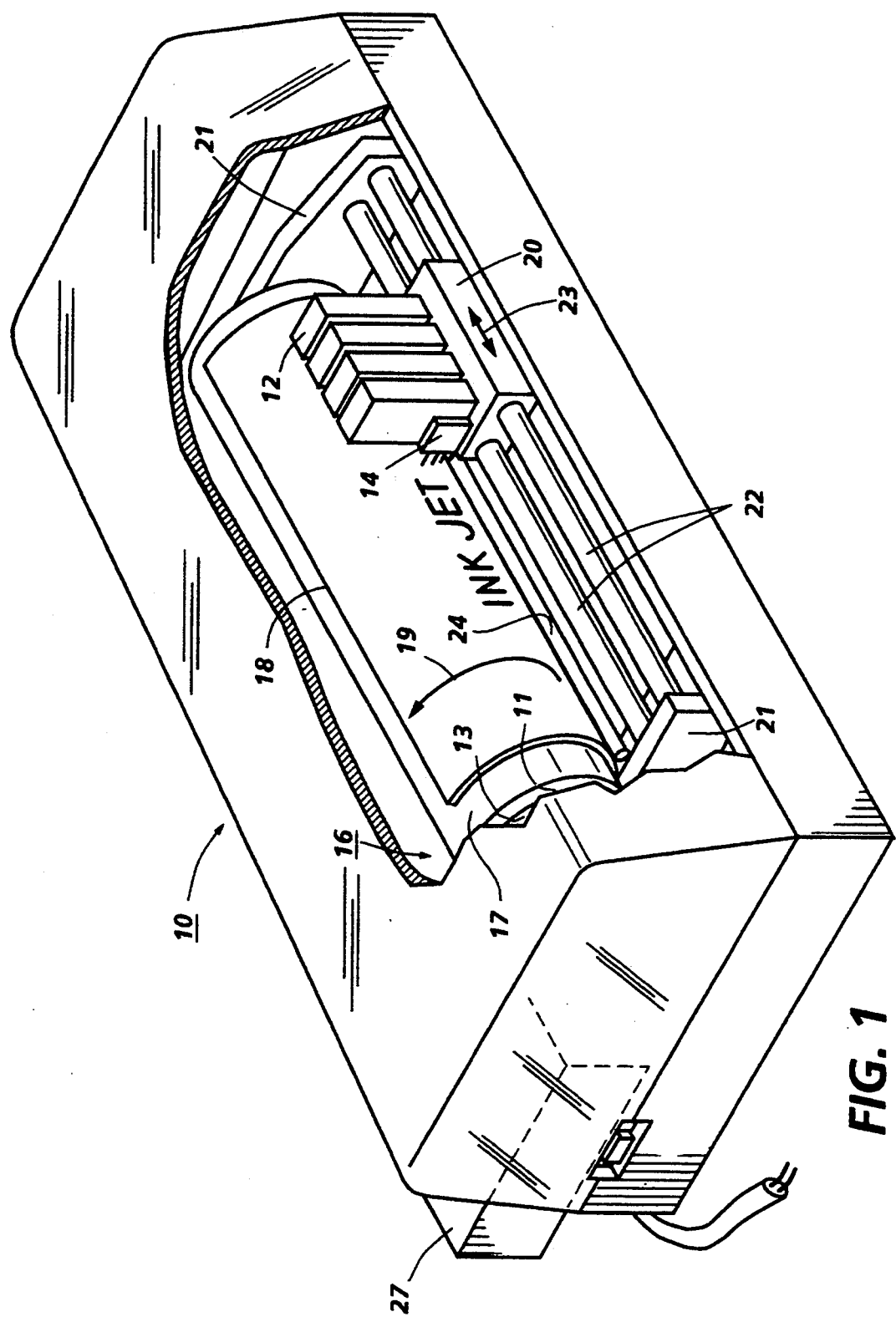
FIG. 1 is a schematic isometric view of a multi-color carriage type, thermal ink jet printer having a plurality of ink cartridges with integral printheads, at least one of which contains ink with magnetic particles.

In FIG. 1, a multicolor, thermal ink jet printer 10 is shown containing several disposable ink supply cartridges 12, each with an integrally attached printhead 14. At least one of the cartridges contains ink with submicron sized magnetic particles therein, and preferably the cartridge having the black ink. Optionally, each of the cartridges or any one of them may be resupplied with ink from a fixed ink supply (not shown) at a remote location within the printer. The ink cartridge and printhead combination are removably mounted on a translatable carriage 20 disposed in a printing zone adjacent the periphery of a cylindrical platen assembly 16. During the printing mode, the carriage confrontingly reciprocates back and forth on, for example, guide rails 22, parallel to the surface 17 of the cylindrical platen assembly 16, as depicted by arrow 23. The cylindrical platen assembly has a diameter of between 10 and 20 cm and is constructed, for example, out of a plastic sleeve 11 having a wall thickness of 3 to 6 mm, with dust proof end caps 13 containing a shaft 15 (see FIG. 2) therethrough. One end of the shaft 15 may be driven by a pulley and timing belt (not shown) by a stepping motor (not shown). The cylindrical platen assembly is rotatably mounted in frame sides 21, which also contain the ends of the guide rails 22. The carriage is driven back and forth across the length of the cylindrical platen assembly by well known means such as, for example, by cable and pulley with a reversible motor (not shown). A recording medium 18, such as, paper, is fed from cassette 27 in cut sheet form to the cylindrical platen assembly 16 where the recording medium is registered with the printing zone and firmly thereon by means well known in the art such as, rolls, gripper bars, star wheels, or a vacuum through vacuum ports (none shown). The printhead has a linear vertical array of nozzles which define the height of a swath of information printed by the translation of the printhead on the carriage. For a detailed description of a typical thermal ink jet printhead refer to U.S. Pat. No. 4,774,530 to Hawkins, incorporated herein by reference. After each swath of information is printed, the cylindrical platen assembly is stepped about its axis for the distance equal to the height of one printed swath in the direction indicated by arrow 19. Thus, the printing zone is that space on the cylindrical platen assembly equal to a printable swath by the printhead. After the recording medium has been printed, one swath at a time until the entire recording medium has been covered, it is directed to a tray (not shown) located above the cassette 27.

For a printhead having a printing resolution of 300 spots per inch (spi), the nozzle areas are about 1200 sq. $\mu$m and the printhead face containing the nozzles are spaced from the recording medium on the cylindrical platen assembly by about 20 mils or 500 $\mu$m. The ejected droplets produce slightly overlapping spots having diameters of 3 mils or 75 $\mu$m. Because of the small size of the printhead nozzles, quantity of pigment and/or particles in the ink presents a serious problem of nozzle clogging and nozzle face contamination by fine ink spray which affects droplet directionality. However, the required magnetic pigment or combination pigment or dye and magnetic particles in the ink has been found suitable when the pigment/particle size is limited to about 2,000 Å with an aspect ratio of at least 4 to 1, and the solids to liquid in the ink dispersion is between 5 and 20 percent. A typical suitable water base ink for black ink is carbon pigment, flake or rod like ferromagnetic material, water, and other additives. As explained below, only a modest increase in particle content to a typical ink is required because of the efficiency of the magnetic pigment/particles when oriented and permanently preserved in the desired magnetic direction to increase its remanence. This increase in efficiency of the magnetic particles enables the use of thermal ink jet printers to produce MICR images, because the modest increase in solids content of the ink does not present nozzle clogging problems.

Figure 2:
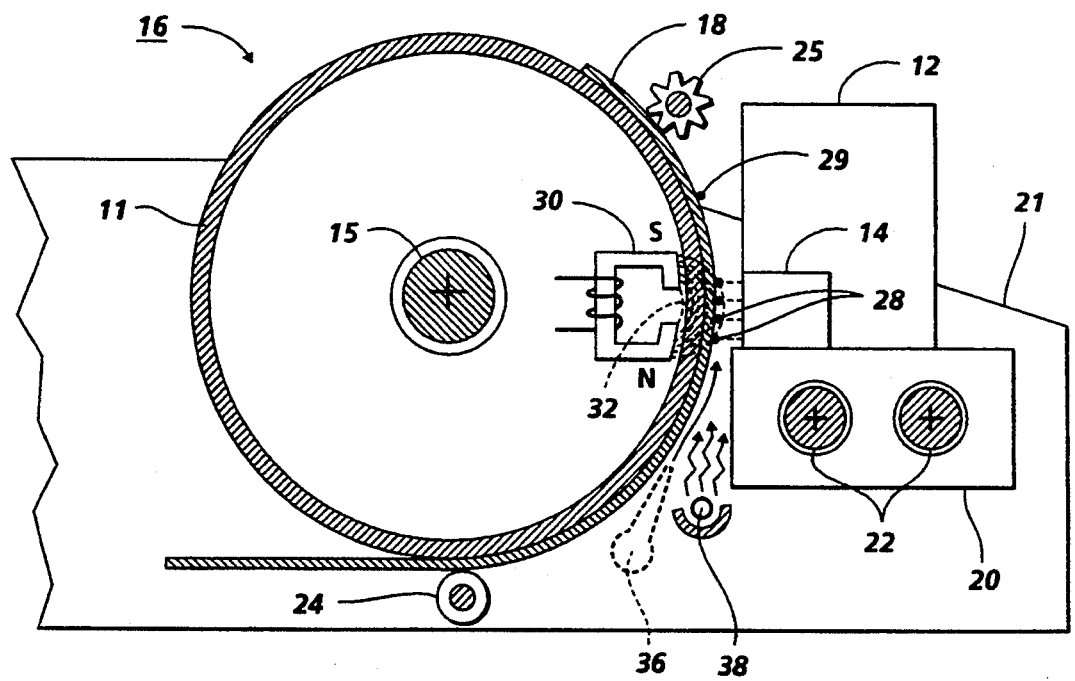
FIG. 2 is a schematic cross-sectional view of the printer platen which holds the recording medium when images are printed thereon.
Figure 3A:
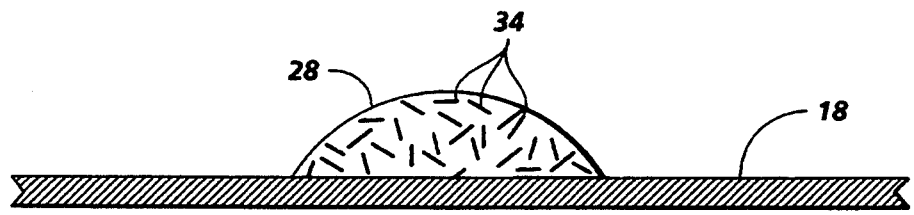
FIG. 3A is an enlarged schematic cross-sectional view of a printed droplet of liquid ink having magnetic particles dispersed therein.
Figure 3B:
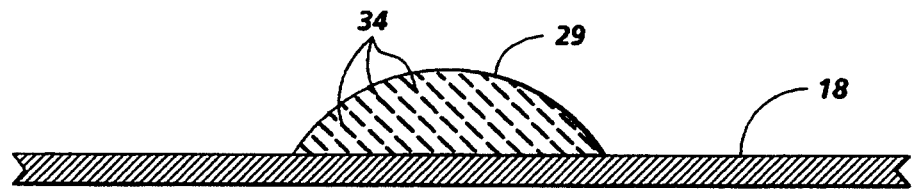
FIG. 3B is an enlarged schematic cross-sectional view of the printed droplet of ink of FIG. 3 after the droplet has dried under the influence of a magnetic field.

Referring to FIG. 2, a schematic cross-sectional side view shows the ink cartridge 12 and integral printhead 14 confrontingly spaced from the cylindrical platen assembly 16. A sheet of recording medium 18 is held on the surface 17 of the sleeve 11 of the platen assembly by registration and feed rolls 24 and star wheel 25. Inside sleeve 11 is a magnet 30, which may be either a permanent magnet or an electromagnet. The poles of the magnet are arranged to place magnetic lines of force 32 generated by the magnet 30 through the printing zone, so that the liquid droplets 28 which impact the recording medium are immediately subjected to the magnetic lines of force, thereby effecting a re-orientation of the magnetic particles 34 (see FIGS. 3A and 3B) in the liquid medium. The printed droplets are dried before leaving the magnetic lines of force, so that this magnetic re-orientation of the magnetic particles in the ink is permanently preserved in the dried droplets 29. A cross-sectional view of a freshly printed liquid ink droplet 28 on recording medium 18 is schematically represented in FIG. 3A, showing the elongated magnetic pigment for particles 34 dispersed with random orientation throughout the still liquid droplet. The magnetic lines of force generated by the electromagnet 30 re-orients the magnetic pigment or particles 34 a few milliseconds later as shown in FIG. 3B. Prior to the recording medium being stepped to receive the next printed swath of information, the printed droplet is allowed to dry while under the influence of the magnetic lines of force 32, thereby permanently preserving the re-oriented magnetic pigment or particles in dried droplet 29. The magnetic pigment of particles may be selected with a large population of particles with shapes enabling easy orientation in a preferred direction.

Depending upon the type of recording medium and the printing speed of the ink jet printer, ambient conditions are generally sufficient to enable drying of liquid images while under the influence of the magnetic field or lines of force without other drying assistance. However, the drying could optionally be ensured by the addition of either a flow of air directed across the liquid images as they are being printed or a means to heat the liquid images on the recording means. The flow of air may be generated by either a vacuum source (not shown) drawing air across the wet images or a fan 36 shown in dashed line. The recording means may optionally be heated, for example, by a radiant heater 38 at a location that enables the heating of the liquid images as the images are printed.

In an alternate embodiment, the printed and dried image may be partially or completely demagnetized after it has been permanently oriented.

Many modifications and variations are apparent from the foregoing description of the invention and all such modifications and variations are intended to be within the scope of the present invention.

We claim:

1. An ink jet printer for printing images capable of being read by a magnetic image character recognition device, comprising:
   a printhead having a plurality of nozzles in communication of a reservoir therein;
   means for supplying liquid ink having magnetic particles dispersed therein to said printhead reservoir;
   means for ejecting droplets of the liquid ink from the printhead nozzles onto a recording medium in response to electrical signals representative of data to form printed data images of liquid ink on said recording medium;
   means for generating a magnetic field having magnetic lines of force in a predetermined direction, said means for generating a magnetic field producing magnetic lines of force in a predetermined arrangement relative to the recording medium, so that the recording medium is influenced by the magnetic lines of force only at a printing zone, and so that the liquid ink droplets are not under the influence of said magnetic lines of force until after the ink droplets impact the recording medium at said printing zone; and
   means for drying the liquid ink droplets on the recording medium which form the printed data images on the recording medium, while said liquid ink droplets are under the influence of the magnetic lanes of force at said printing zone, so that the magnetic particles in the liquid ink are oriented according to the predetermined direction of said magnetic lines of force while the magnetic particles in the liquid ink forming the printed data images are mobile in the liquid ink, and so that the oriented magnetic particles are permanently preserved in the printed data images after said printed data images formed by liquid ink droplets are dried.

2. The ink jet printer of claim 1, wherein the magnetic particles in the liquid ink is limited in size to about 2000 Å with an aspect ratio of at least 4 to 1.

3. The ink jet printer of claim 2, wherein the ink is a water based ink and the magnetic particles therein are a ferromagnetic material.

4. The ink jet printer of claim 1, wherein the printer further comprises a cylindrical platen on which the recording medium is held while the printed data ink images are being printed thereon.

5. The ink jet printer of claim 4, wherein the magnetic field is from a magnet within the platen.

6. The ink jet printer of claim 5, wherein the drying means is an air flow directed across the printed data images as the printed data images are being printed by the ejected droplets.

7. The ink jet printer of claim 5, wherein the drying means is a heating means which heats the printed data images as the printed data images are being printed by ejected droplets.

* * * * *